(12) United States Patent
Khoshnevis

(10) Patent No.: US 12,703,121 B2
(45) Date of Patent: Aug. 11, 2026

(54) DISCRETE DELIVERY OF MATERIAL

(71) Applicant: CONTOUR CRAFTING CORPORATION, Marina Del Rey, CA (US)

(72) Inventor: Behrokh Khoshnevis, Marina Del Rey, CA (US)

(73) Assignee: Contour Crafting Corporation, El Segundo, CA (US)

( * ) Notice: Subject to any disclaimer, the term of this patent is extended or adjusted under 35 U.S.C. 154(b) by 861 days.

(21) Appl. No.: 17/919,505

(22) PCT Filed: Apr. 16, 2021

(86) PCT No.: PCT/US2021/027820

§ 371 (c)(1),
(2) Date: Oct. 17, 2022

(87) PCT Pub. No.: WO2021/212068

PCT Pub. Date: Oct. 21, 2021

(65) Prior Publication Data

US 2023/0151623 A1 May 18, 2023

Related U.S. Application Data

(60) Provisional application No. 63/012,069, filed on Apr. 17, 2020.

(51) Int. Cl.

*B28B 1/00* (2006.01)
*B33Y 30/00* (2015.01)
*B61B 7/00* (2006.01)
*B61B 12/00* (2006.01)

(Continued)

(52) U.S. Cl.

CPC .............. *B28B 1/001* (2013.01); *B33Y 30/00* (2014.12); *B61B 7/00* (2013.01); *B61B 12/007* (2013.01);

(Continued)

(58) Field of Classification Search

CPC ....... E04B 1/3505; B33Y 30/00; B28B 1/001; E04G 21/02; E04G 21/14; E04G 21/0463;

(Continued)

(56) References Cited

U.S. PATENT DOCUMENTS 4,848,241 A * 7/1989 Kunczynski ............ B61B 7/045 104/173.1
7,641,461 B2 * 1/2010 Khoshnevis ........ E04G 21/0463 425/375

(Continued)

FOREIGN PATENT DOCUMENTS

CN 108298088 A 7/2018
CN 108688161 A * 10/2018 ............. B29C 64/20

(Continued)

OTHER PUBLICATIONS

International Search Report and Written Opinion for International Application No. PCT/US2021/027820 mailed Aug. 6, 2022.

(Continued)

*Primary Examiner* — Cheng Lin
(74) *Attorney, Agent, or Firm* — Risley IP; David Risley

(57) ABSTRACT

Construction 3D printing, although a technology that is expected to provide cost, speed and environmental benefits as compared to the traditional construction practices, suffers from inefficient and often troublesome material delivery by pumping cementitious material through hoses or pipes. The present application addresses the need for a consistent and discrete payload delivery between a source and a moving destination. The invention describes an aerial tram delivery system that provides real-time, on-demand, and discrete transportation of material from a material source to the moving destination printheads of the construction 3D printer. Such discrete delivery of material is applicable and beneficial to other applications as described.

29 Claims, 12 Drawing Sheets

(51) Int. Cl.

| | |
|---|---|
| ***B61B 12/06*** | (2006.01) |
| ***B61B 12/10*** | (2006.01) |
| ***B64D 1/22*** | (2006.01) |
| ***B66C 21/04*** | (2006.01) |
| ***E04B 1/35*** | (2006.01) |
| ***E04G 21/02*** | (2006.01) |
| ***E04G 21/04*** | (2006.01) |
| ***E04G 21/14*** | (2006.01) |

(52) U.S. Cl.

CPC .............. *B61B 12/06* (2013.01); *B61B 12/10* (2013.01); *B64D 1/22* (2013.01); *B66C 21/04* (2013.01); *E04B 1/3505* (2013.01); *E04G 21/02* (2013.01); *E04G 21/0427* (2013.01); *E04G 21/0463* (2013.01); *E04G 21/14* (2013.01)

(58) Field of Classification Search

CPC ..... E04G 21/0427; B61B 7/00; B61B 12/007; B61B 12/06; B61B 12/10; B64D 1/22; B66C 21/04

See application file for complete search history.

(56) References Cited

U.S. PATENT DOCUMENTS 10,065,361 B2 * 9/2018 Susnjara ................. B29C 70/16
11,230,032 B2 * 1/2022 Post ...................... E04B 1/3505
2016/0114887 A1 4/2016 Zhou et al.
2017/0095973 A1 * 4/2017 Chamberlain ......... B33Y 10/00
2017/0350115 A1 * 12/2017 Rocher ................. B29C 64/209
2019/0315016 A1 10/2019 Post

FOREIGN PATENT DOCUMENTS

DE 102014015335 A1 4/2016
FR 2647405 A1 * 11/1990 ............. B61B 12/10
JP 11-035279 A 2/1999
JP H1135279 A * 2/1999
JP 2000016759 A * 1/2000
KR 10-2009-0003821 B1 1/2009
KR 20090003821 A * 1/2009 ............. B61B 12/10
KR 10-1856642 B1 5/2018
WO WO-2015145019 A1 * 10/2015 ............. B61B 12/10

OTHER PUBLICATIONS

European Search Report in related EP Application No. 21787753, mailed Jul. 17, 2024.

Partial European Search Report for Patent Application No. 21787753.9, dated Apr. 26, 2024, pp. 1-14.

* cited by examiner 600
608

600
610
608

600
602

600
602
604
606

DISCRETE DELIVERY OF MATERIAL

CROSS-REFERENCE TO RELATED APPLICATIONS

This application is the 35 U.S.C. § 371 national stage application of International Application No. PCT/US2021/027820, filed Apr. 16, 2021, which claims priority to U.S. provisional application entitled, "DISCRETE DELIVERY OF MATERIAL," having Ser. No. 63/012,069, filed Apr. 17, 2020, which is entirely incorporated herein by reference.

PRIORITY CLAIM

The present application claims priority to U.S. provisional patent application Ser. No. 63/012,069 filed Apr. 17, 2020, which is incorporated herein in its entirety by reference.

FIELD

The present application relates to material handling and delivery.

BACKGROUND

The technology disclosed by the present application has many applications ranging from automated storage and retrieval systems (AS/RS) as practiced in warehousing, to placing items in or picking them out of boxes while boxes are moving on conveyor belts. Originally conceived to solve a key barrier in large scale additive manufacturing, the technology may be adapted for other uses. As used herein, construction 3D printing refers to a type of large-scale additive manufacturing that enables automation in many tasks of the construction industry.

Construction 3D printing has been increasingly receiving attention in the last few years but despite the attention that it has received its acceptance as an alternative to conventional construction has been minimal. The reluctance of the construction market has been primarily due to the questionable ability of the new approach to present economic advantage over conventional construction methods. The reality is that construction 3D printing only builds the concrete shell of the building, which constitutes only about 20% to 30% of the value of a completed structure. Consequently, any saving must be due to reduced labor and speed of construction. However, the cost of leasing or amortizing, transporting, installing, operating, and maintaining a relatively costly machine is a major deterrent for potential users of the technology. This may be why other technically proven automation approaches such as building shell construction with automatic brick laying machines, which first appeared more than a century ago and continued to evolve with many variations over the last few decades, have never managed to demonstrate the anticipated market success.

It should be noted that the brick and mortar that automated brick laying machines use is like what is used in manual brick laying. In case of construction 3D printing, however, the choice of material which is predominantly used is significantly more expensive and often has inferior performance compared to the material that conventional concrete construction uses. The combination of machine related expense and higher cost and lower performance of material used in construction 3D printing makes the task of this new way of building doubly challenging to prevail in the marketplace, as compared to automatic brick laying machines.

Construction 3D printing is struggling to compete with the conventional concrete construction industry, but it can only use mortar, not concrete. Mortar, as is used in conventional applications such as manual brick laying, is a mixture of about one part Portland cement and three to four parts sand (i.e., contains about 20% cement only). The mortar used in 3D printing, however, typically has a significantly smaller amount of sand (20% to 50% by weight) and hence has 50% to 80% cement. The low level of sand is due to the difficulty of pumping the wet mixtures with high sand content through hoses and other conduits. In contrast to construction 3D printing, conventional concrete construction uses real concrete which is a mixture of about one part cement, three parts sand (fine aggregate) and 3 parts gravel (large aggregate). In other words, conventional concrete only contains about 15% cement by weight.

Concrete has several advantages over mortar for building construction due to numerous technical, economical, and environmental considerations. From a technical standpoint, using higher amounts of sand and gravel improves the dimensional stability of the hardened material, reduces the risk of cracking in the structure, and improves the long-term durability of the built structure. From an economical viewpoint, inclusion of higher amounts of sand and large aggregates makes it possible to reduce the cement content, which is the most expensive ingredient of cementitious mixtures.

The third advantage of low cement content mixes is the resulting reduction in the carbon footprint of the built structures. Production of Portland cement produces significant amount of $CO_2$. Consequently, Inclusion of larger amount of sand and addition of gravel in the cementitious mix reduces the cement content to yield an eco-friendlier construction material.

Accordingly, if construction 3D printing could use a material which is very similar to conventional concrete then the new technology would be in a better position to compete with conventional concrete construction. However, the only mode of material transfer currently used in construction 3D printing is a relatively narrow rubber hose with a 1" to 2" inner diameter. Thicker hoses pose lesser opposition to material passage but would require larger bend radii to reach the moving nozzle, and because of the higher capacity of thicker hoses the material flow in them would be slower hence the increased chance of material curing inside the hose. The new material delivery system is a superior alternative to hose delivery which suffers from disadvantages including those summarized in the paragraph below.

For example, pumping cementitious mixes with large portion of sand through a hose causes frequent hose clogging, while pumping mixes with large aggregates (gravels) through a hose with reasonable diameter size is not possible due to immediate clogging. Over time, the inner opening diameter of hoses used to pump cementitious materials progressively gets smaller because of addition of thin layers of cured concrete. Hose lubrication and cleaning is tedious and takes time. Hose management, i.e., connecting the hose to the moving nozzle and keeping its body from colliding with machine or built structure, is a problem regardless of the choice of material passed through it. Pushing abrasive construction material through rubber hoses involves a significant amount of friction which presents opposition against material movement inside the hose. Furthermore, the high viscosity of 3D printable cementitious materials adds significantly to and compounds this problem. The typical pump choice for pushing viscous concrete is progressing cavity pump, which typically needs very bulky 3 Phase electric motors that consume very high amounts of electricity.

It would be desirable, therefore, to develop new methods, systems, and apparatus for delivery of cementitious materials for construction 3D printing, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

The present aerial tram delivery technology for transporting 3D printing material from material source to a moving printhead, sometime referred to herein as "CrafTram," eliminates the need for problematic hoses commonly used for material delivery in construction-scale 3D printing. CrafTram can transport a wide range of materials irrespective of their constituents and is not subject to the many restrictions that are imposed by hoses as means for material delivery. This means that the material can contain any constituents that can be processed by the machine for fabrication of the intended objects. For example, transporting wet or dry cementitious mixes with high abrasive sand and large gravel content would be as easy as transporting mortar mixes with low sand content.

Following are some notable advantages of the CrafTram concept:

CrafTram can be rapidly setup at the application site and has minimal intrusion into the machine space and build envelope during the printing operation.

CrafTram can transport premixed wet material to be readily fed to the printhead. It can also deliver the premixed dry material to be chemically or thermally activated at the machine site immediately before being fed to the printhead. The CrafTram approach may be used for imbedding in or attaching to the structure some components while the structures is being 3D printed. These components could include reinforcement elements, pipe segments, electrical modules, etc. At the printer site a robotic arm(s) may receive these components from the transporting tram and imbed them in or install them on the structure being printed.

Another very attractive advantage of CrafTram is its very low energy consumption due to very low friction operation. For example, in the field of 3D printing the one or two electric motors that operate the CrafTram system collectively consume less than 1/20 of the concrete pump with similar delivery rate, for the choice of material that conventional concrete pumps can handle.

Further, use of the CrafTram system can be easily adapted to other applications, for example but not limited to, delivering, or retrieving discrete payloads into or from a one-dimensional, two-dimensional, or three-dimensional spatial array of one or more destinations. An example of such a system is storage and retrieval of parcels into and out of one or more shelves of a warehouse or delivering discrete doses of ingredients to one or more food preparation stations. The application can go beyond transporting between stationary locations and could include situations in which the source or destination or both could be moving in space while being accessed for delivery or retrieval. In these situations, the tram than picks up the commodity at the source passes it at the rendezvous point (e.g. a tower top) to the tram which delivers the commodity to its destination point.

In an aspect of the disclosure, a material delivery system for transferring material from at least one material source to at least one material destination, wherein the at least one material destination is moveable in at least one spatial dimension relative to the at least one material source. The system may include a cable mechanism extending between the at least one material source and the at least one material destination. The cable mechanism may include at least one cable, a tram coupled to the at least one cable, enabling movement of the tram between the at least one material source and the at least one material destination, a drive mechanism that controls the position of the tram along the cable mechanism, and an accumulator mechanism that maintains tension of the at least one cable within an operational range during movement of the at least one material destination relative to the at least one material source. In an aspect, the at least one material destination is, or includes, a printhead for a construction-scale 3D printer.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

The concept of material or passenger transport by aerial tram is known. The first reported aerial tram system was used in Europe in 1644 to transport soil over a river and was powered by horses. Since then, there have been numerous applications and installations of aerial trams. In the known art, however, the source and destination between which the aerial tram travels are both fixed locations. In CrafTram, however, the destination where the unloading takes place can be in motion in the 3D space. Also, as indicated in some CrafTram applications, such as warehousing, both locations of commodity source and destination can be variable.

Figure 1:
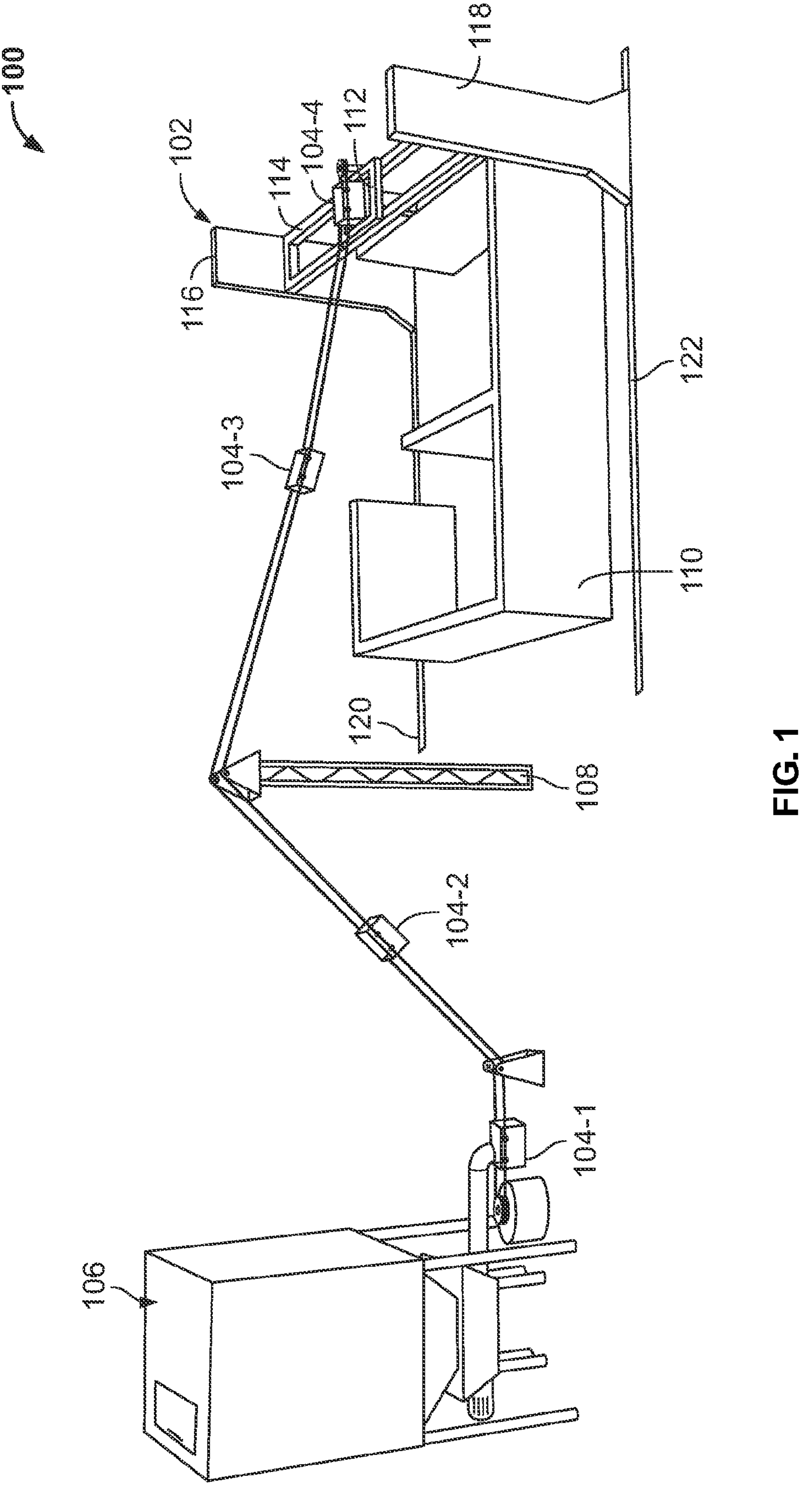
FIG. 1 is a diagram illustrating a construction-scale 3D printing system in operation with a gantry robotic structure.

FIG. 1 shows a CrafTram delivery system 100 implemented for a bridge gantry concrete printer robot 102. Note that the single tram 104 is shown in four different positions. From right: Receiving 104-1 material from a mixer 106, climbing 104-2 to a tower 108, approaching 104-3 a printing machine 102, and unloading 104-4 the material into printhead hopper.

In the configuration 100 shown in FIG. 1, the printhead 112 and its incoming material hopper move on the gantry bridge 114. The bridge progressively climbs up the two gantry columns 116, 118 for each built layer of the building 110, and the entire gantry moves on the two rails 120, 122 installed on the ground to allow the printhead 112 to travel within the construction envelope.

The material loading site 106 is connected to the moving printhead by means of cable which suspends and moves the tram. A tower 108 is used to lift the cable(s) and keep them high enough so that the tram does not collide with the top of the walls of the structure that is being constructed.

Figure 2:
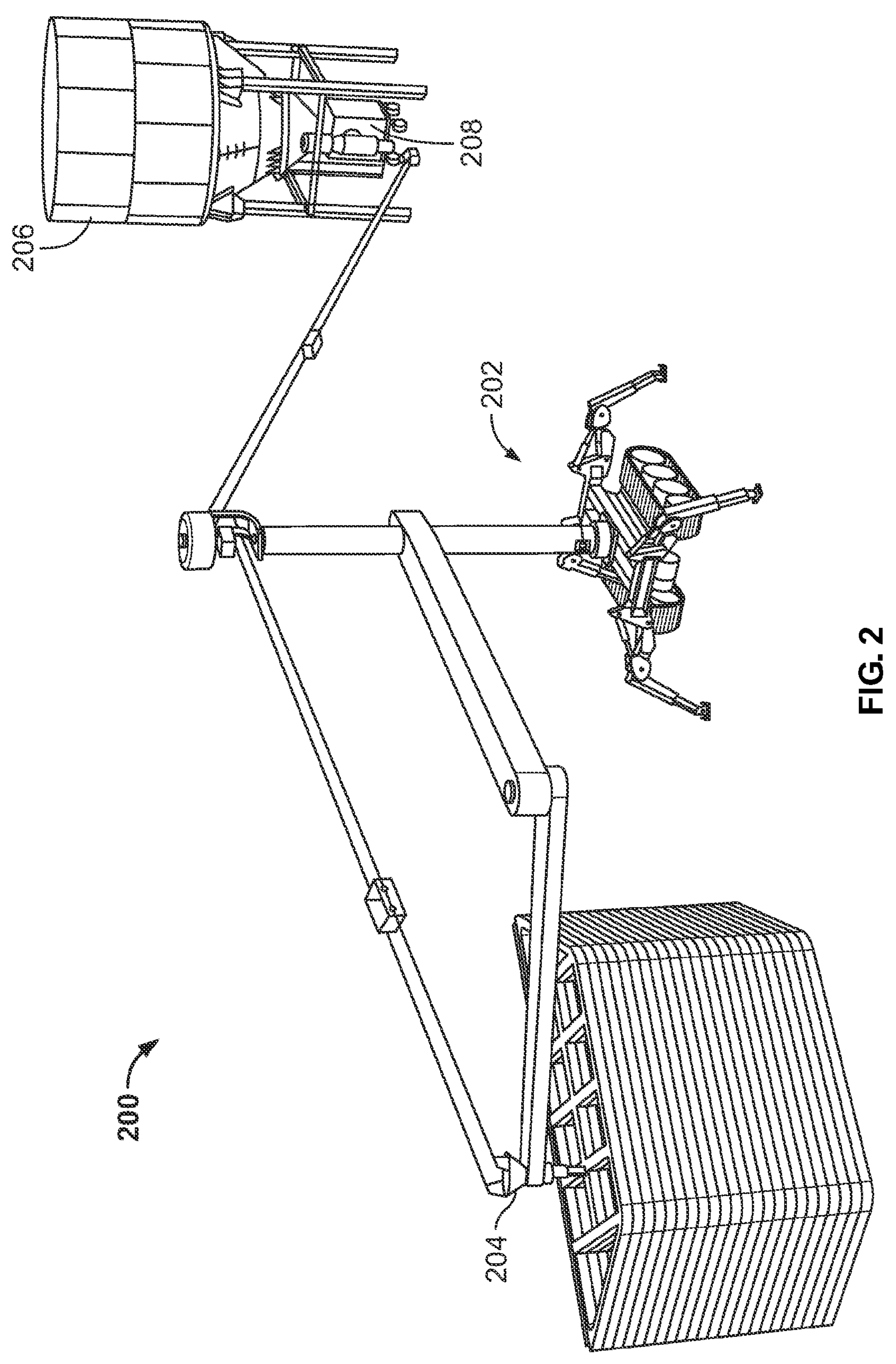
FIG. 2 is a diagram illustrating a construction-scale 3D printing system in operation with a polar coordinate robotic structure, according to an alternative embodiment.

CrafTram may also be used with other robot configurations such a cantilever gantry, articulated arm robot, polar coordinate robot, etc. For certain robotic configurations, such as in the SCARA style polar coordinate robot, the robot's main pole may concurrently serve as the CrafTram tower. In such cases minimal additional hardware would be needed for utilizing CrafTram. For example, FIG. 2 shows an alternative system 200 in which a rover-mounted SCARA style robot 202 is used to move and position the printhead 204 (i.e., concrete extruder nozzle).

The silo 206 at the construction site is the dry material source from which the material can be automatically delivered to a mixer 208 located under or near the silo. In case of wet delivery, dry material and water are introduced to the mixer on demand. In case of dry material delivery to the printer the silo directly feeds appropriate doses into the tram. The tram then carries the dry material to the printhead 204 site and wet mixing is done on the robot by adding water to the dray material and mixing the material immediately before printing.

In either wet or dry material delivery cases the objective is to deliver the material by a tram from the silo site to the hopper located on top of the moving printhead in such a manner that there would always be a surplus of material in the hopper such that the printhead could extrude continuously between consecutive deliveries. This requires the capacity of the hopper to be large enough to sustain supplying material to the printhead while the tram is in transit and as it is being loaded with new batch of material to be brought back to the printer.

Note that alternative ways of delivery of the material from the silo site to the CrafTram tower-top are also possible. For example, vertical lift of the material could be done using a bucket lift elevator attached to the tower. Such a scenario applies to the double tram configuration where material is passed to the tram at the tower-top.

Design Alternatives—Number of Trams:

A CrafTram system may be configured as a Single-Tram or a Double-Tram configuration for CrafTram. In the Single-Tram case, shown in FIG. 1, only one tram is used in the whole system which transits between the loading point and unloading point, and then returns to start another cycle, passing over the tower in each half cycle. A swiveling pulley set cable-holding mechanism or equivalent be me used at the tower top to facilitate varying positions of the printhead. The tower may be omitted where a direct cable line does not pose the risk of interfering with the built structure or other obstacles. This condition would require the material loading point to be higher than the maximum height of the structure to be built.

In Double-Tram embodiments, a first tram "Tram-1" operates between the loading point and the tower top, while a second tram "Tram-2" operates between the tower top and the moving payload destination. When both trams become available at the tower top, Tram-1 transfers its load to Tram-2 and immediately after the load transfer each tram takes its own separate path. The rendezvous on tower top is based on the simple arrangement in which the tram which arrives first to the tower top awaits the arrival of the other tram and once both are available the load is immediately transferred. When Tram-1 is positioned on top of Tram-2, the door(s) at its bottom open and load the load is dumped by the force of gravity into Tram-2. The mechanism for alignment of the orientation of Tram-1 to conform to the varying orientation of Tram-2 is explained in the section related to trams and their related mechanisms. Because of the non-stick surface lining of the trams, material transfer takes place almost instantaneously. Advantages of a Double-Tram approach may include a faster rate of material delivery, which may be as much as twice-as-fast as a comparable Single-Tram approach.

In general applications such as warehousing, either or both source and destination locations of the tram may be stationary or moving points in space.

Design Alternatives—Number of Cables:

Two single-cable configurations and a double-cable configuration are described below.

Figure 3:
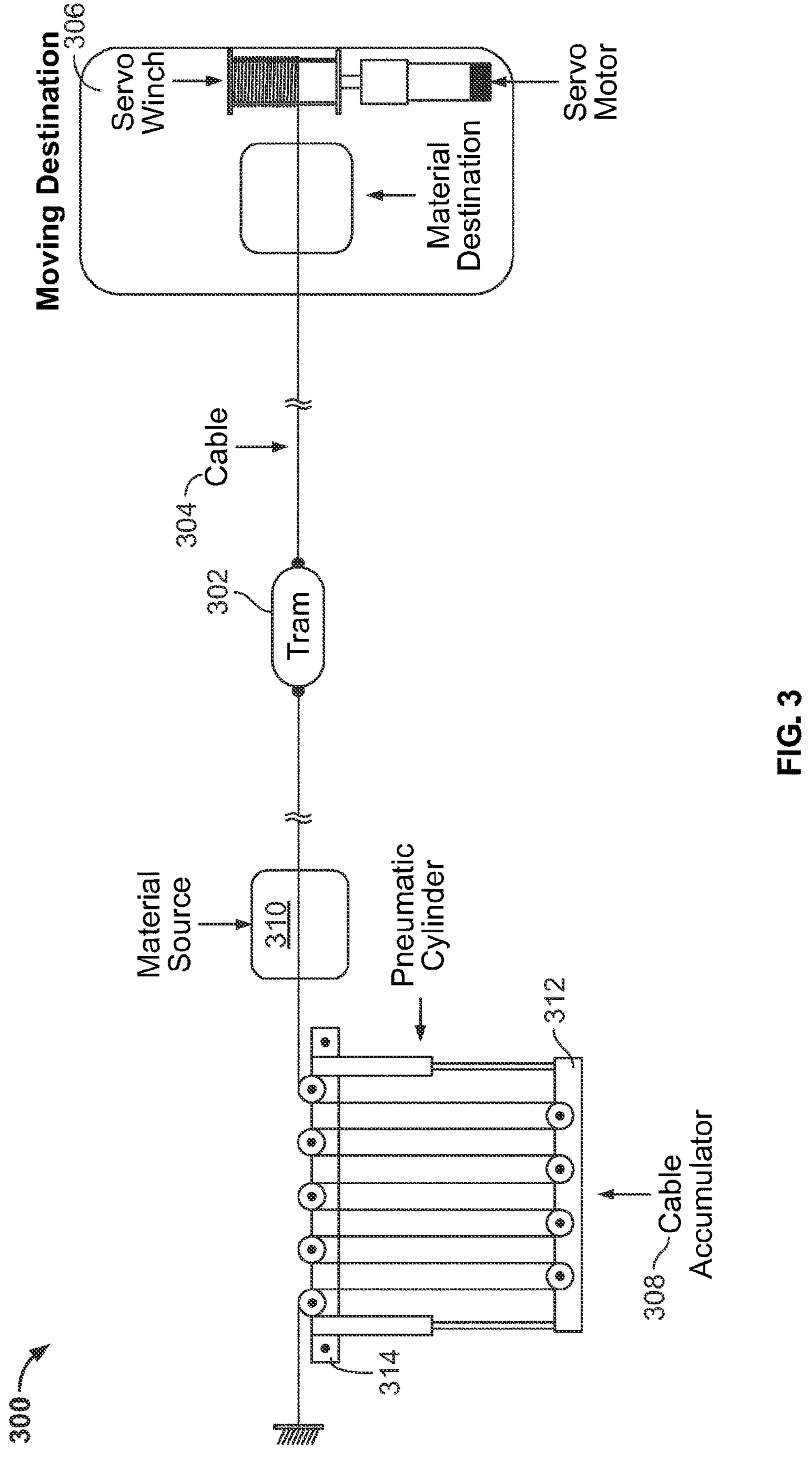
FIG. 3 is a schematic diagram illustrating a single-cable material delivery system with a passive accumulator.

A1. Single-Cable Configuration Using Passive Cable Accumulator:

FIG. 3 shows a system 300 configuration in which the tram 302 is suspended from a single cable 304. In this configuration the printer site may not be passive with respect to the tram movement control. The tram movement in this case could be controlled by a servomotor-controlled winch 306 (servo-winch), which would be installed at the printhead site. A servo winch maintains a desired constant tension on the cable by means of sensing motor current, which is proportional to the cable tension.

The passive cable accumulator assembly 312 is shown in FIG. 3 whose functions are: a) to provide a fixed desired pull force in order to maintain a fixed cable tension so that only an acceptable amount of cable sagging takes place when the loaded tram traverses on the cables, and b) to release the cable to allow the total length of the cable to extend when the delivery destination (i.e., the printhead hopper) gets further away from the material loading point, and to take up the cable slack when the printhead (destination point) gets closer to the material source. To send the tram to the material source, the servo-winch unwinds and keeps releasing the cable, which is taken up (pulled) by the passive accumulator until the tram reaches the material source 310. At this point depending on whether the printhead is getting closer or further away from the loading point, the servo-winch is controlled in such a way that it releases or takes up the cable at a speed which is coordinated with the printhead speed in the 3D space. For example, while the tram is being filled at the material source, movement of the printhead away from the material source should drag the tram away from the loading station. The coordination may be achieved by installing a sensor at the loading point which sends a loading status signal to the controller which would in turn makes the servo-winch keep releasing the cable until the tram is filled and ready to move back toward the printhead. Utilization of an algorithm which incorporates the real-time coordinates of the printhead and its immediate trajectory can be used to achieve a smoother control. Based on the capacity of the tram and speed of material feeding by the mixer, the loading may not take more than a few seconds.

When the tram is filled, the servo-winch pulls it all the way to the printhead hopper site, senses its arrival and after swiftly delivering the load, it unwinds the cable so that the tram can return to the material source by the pulling force of the cable accumulator.

A note about the cable accumulator: A cable accumulator may be made with two sets of pulleys 312, 314, as shown in FIG. 3. The upper set 314 is fixed to a stationary structure while the lower set 312 may be pushed down by linear actuators (passively or actively controlled), by constant force springs, or simply by a dead weight. Examples of linear actuators are pneumatic piston-cylinders and electric linear actuators. Weights are least desirable because they pose inertia which would resist sudden movement. Also, the elasticity of constant-force springs deteriorates at high cycles (typically 5000 cycles is the limit). Electric actuators consume energy. The ideal choice in this case is often pneumatic actuation, which is the choice shown in FIG. 3. Once pneumatic cylinders are filled with pressurized air at desired pressure, if they are connected to an air tank with a capacity substantially higher than theirs, then they maintain a relatively fix linear plunger force without needing more air to be pumped into them, unless there is air leakage. Accordingly, a cable accumulator using pneumatic cylinders may be considered a passive accumulator which does not need external energy for operation. A desired cable tension can be maintained by a pneumatic cable accumulator through initially increasing the air pressure by pumping air until the desired cable tension is achieved.

Figure 4:
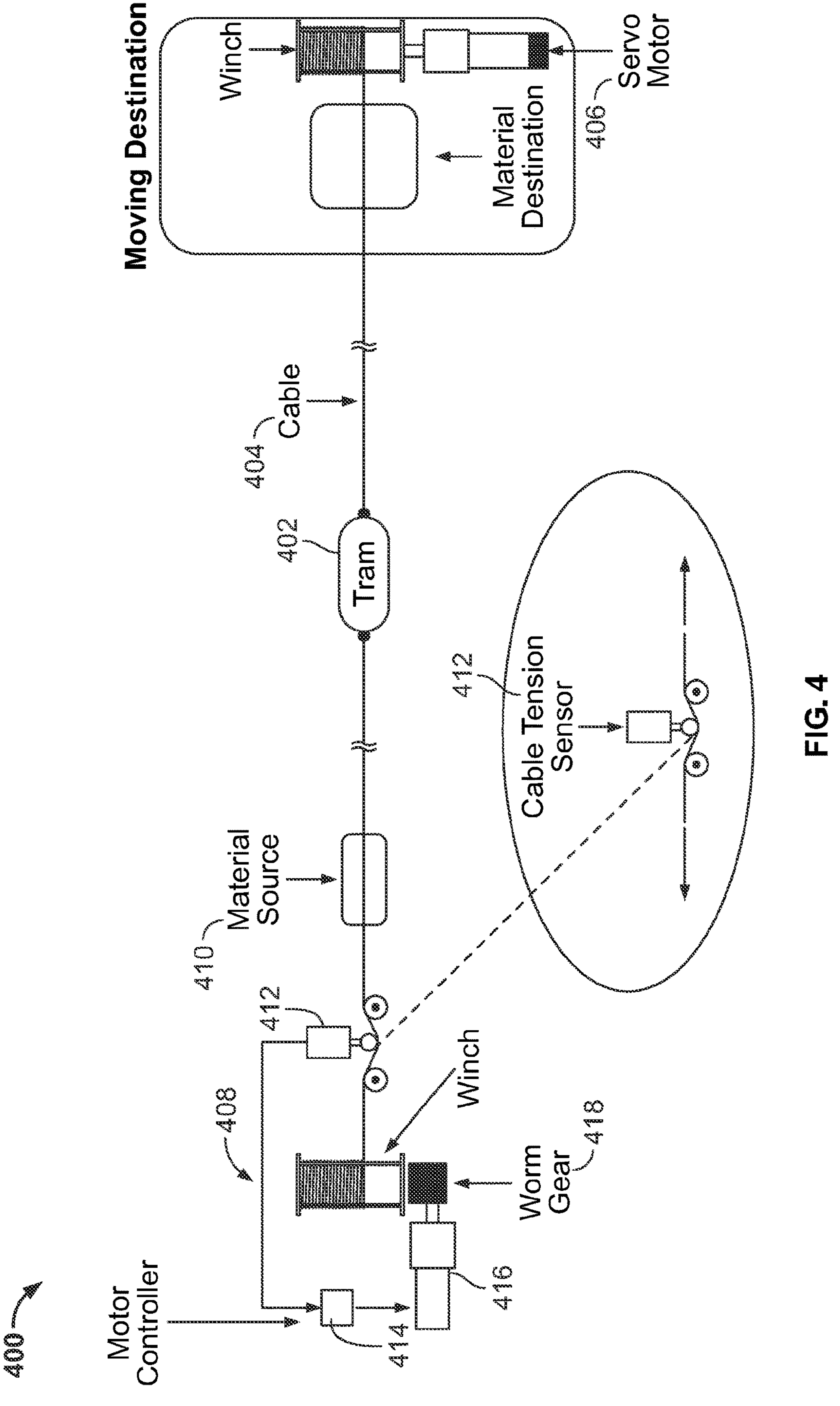
FIG. 4 is a schematic diagram illustrating a single-cable material delivery system with an active accumulator.

A2. Single-Cable Configuration Using a Motorized Winch as Active Cable Accumulator:

In this configuration, shown in FIG. 4, the passive cable accumulator 308 is replaced with an active motorized winch system 408, which has the advantage of being much more compact and less complex than a passive cable accumulator. Here the winch is coupled with a sensor 412 and is placed at the material source site 410 (or at any other point such that the travel of the tram between the material source and destination remains unhindered). The sensor measures the cable 404 tension and reports it to a simple cable tension controller 414, which turns the winch motor 416 off if cable tension reaches a critical level, and turns the motor 416 on when the tension drops below another critical value. For any tension amount between the two critical values the controller does not change the state of the motor. In other words, when the tension of the cable drops too low the winch turns in the direction of tightening the cable to the desirable extent, and when the sensor reports too much cable tightness the winch unwinds to keep the cable tightness within control. The winch and sensor may be coupled directly to operate collaboratively in a closed feedback loop in isolation from the system controller.

When the sensor 412 reports a drop in tightness this could mean a) the servo winch 406 on the robot is unwinding its cable to send the tram 402 to the loading point, b) the printhead is getting close to the loading point hence causing a slack in the cable, or c) the tram just dropped its load in the hopper and became much lighter than its loaded state. In either of these cases the target cable tightness must be maintained.

The motorized winch 408 performs the function of an accumulator, but it takes much less volume, however unlike the accumulator, which is passive, i.e., uses no energy and is always ready to function without the need for control, the motorized winch consumes energy and needs to be controlled. To save energy, using a worm-gear 418 with the winch drive motor is advisable because worm gears cannot be back-driven hence when the desired cable tension is achieved the motor can just shut down. Conversely, if a back drivable gearbox is used, the motor would have to constantly use electricity to fight the force of the cable just to keep its tension at the desired level, even when there is no tram movement.

Furthermore, the reliability of a motorized winch cable accumulator depends on the reliability of the motor and the reliability of the cable tension sensor. In case of a malfunction too much cable slack or excessive cable pull (which may result in cable breakage) can occur. Both consequences of malfunction can cause the tram to drop from overhead to the ground and on its downward path could hit the freshly built wall tops of the structure being printed and ruin the build. To increase the reliability of the module, cable tension could as well be sensed simultaneously by continuously monitoring the electric current drawn by the servo motor that turns the winch cylinder. The higher the cable tension, the higher would be the current drawn by the winch motor, however this is only possible when a back-drivable gear, not a worm gear is used.

A servo-winch may be used in place of what is called a motorized winch in this application, however, servo systems are very responsive and can accurately produce a wide range of speeds. Accordingly, servo systems are more expensive and have a more complex controller electronics. This level of sophistication is not required to drive a winch which is only supposed to maintain a certain tension in the cable.

Figure 5:
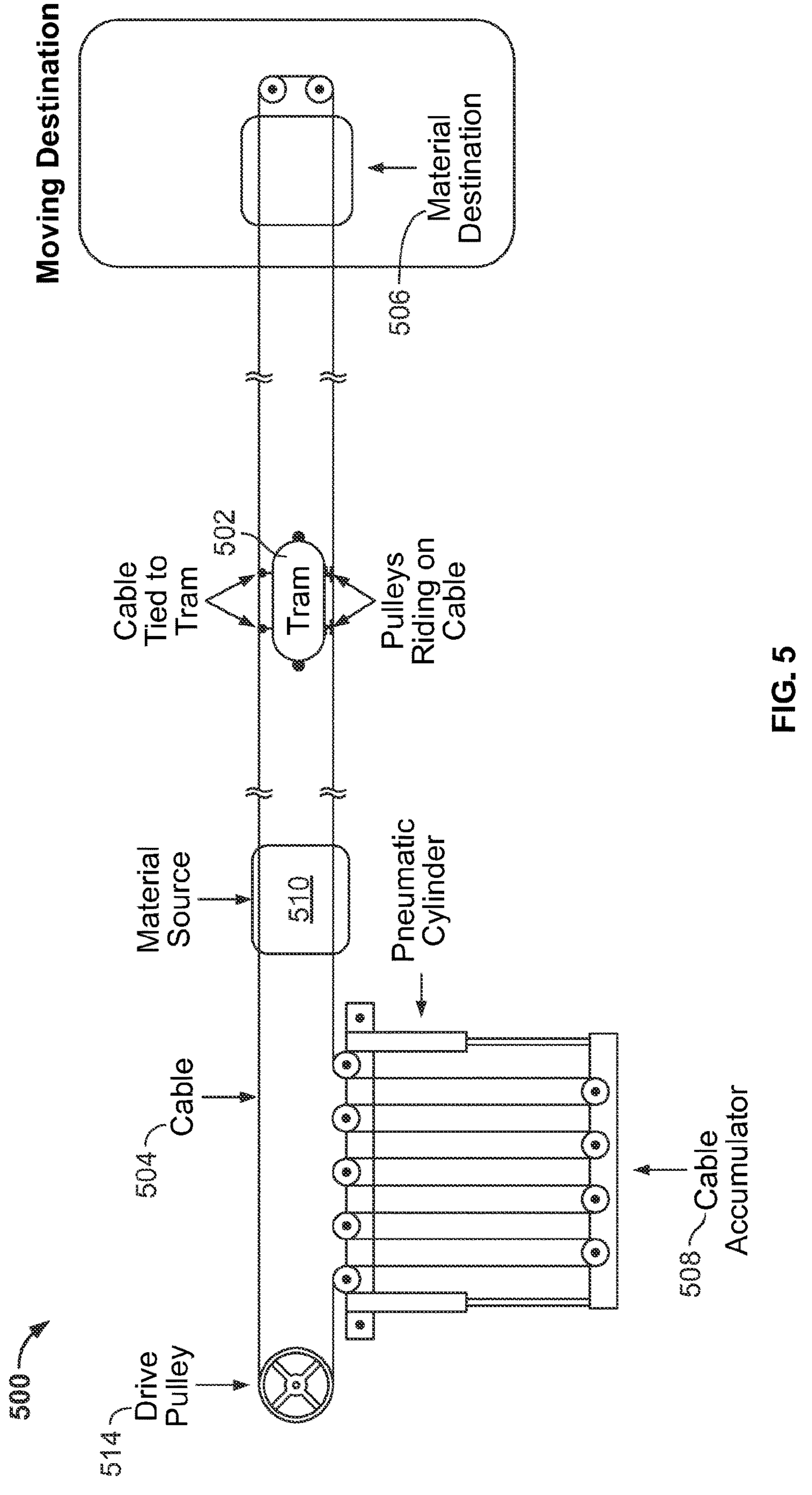
FIG. 5 is a schematic diagram illustrating a double-cable material delivery system with a passive accumulator.

B. Double-Cable Configuration:

FIG. 5 shows a schematic diagram in which the machine site 506 and the loading point 510 (which could be the silo site if a single tram is used, or the CrafTram tower-top where load transfer takes place, when two trams are used) are shown. In this configuration a double-cable arrangement is used. Besides providing more stability for the tram 502, this configuration has the added important advantage of allowing the printing robot to be passive with respect to the control of the tram position and only a drive pulley, which need not be installed on the machine, handles the tram movement and positioning. Here the tram is suspended from two cable strands, one on each side, but it is only locked on one side to one of the cable strands, and it rests on the second cable strand on its other side by means of two or more pulleys.

The passive cable accumulator assembly 508 is shown in FIG. 5 (not shown in FIG. 1 for simplicity) whose functions are the same as those described earlier in the case of single-cable system with passive accumulator.

For sake of simplicity, we assume that the robot and printhead are stationary. In this case the motorized large pulley 514 on the loading point can move the tram in either direction by rotating in the respective direction. When the tram moves in one direction the return cable moves in the opposite direction under the tram pulleys which are installed on the opposite side of the tram where the cables are installed.

Transportation and delivery of the tram often takes place while the printhead and/or the robot are moving. In this case the cable accumulator passively releases more cable if the printhead keeps getting away, or it would be taking up the slack in the cable if the printhead gets closer to the loading point. Note that the winch speed should be high enough to catch up with the printhead movement when it tries to send the tram to the printhead while the printer is getting away from the CrafTram tower. Coordination of the speed of the tram with the speed of printhead movement is done by the control system which is always aware of the winch rotational speed and the printhead movement direction and speed. This control system varies the drive pulley speed for timely and smooth tram arrival and departure to and from the printhead site.

A progressively raising telescopic tower may be used to minimize the trams travel distance while lower layers are being printed. In this case the tower rises as the structure is being built. A rising tower system may require a separate cable accumulator module for the silo side of the cable.

The drive pulley groove may be lined with high friction material such as rubber to minimize cable slippage. Also, a motorized winch in which one end of the cable coil winds the cable while the other end unwinds it may be used in place of the drive pulley. The advantage of the winch may include higher friction, but disadvantages may include excessive cable coil lateral movement for long robot movement.

Tram Designs:

The tram may have different geometrical shapes such rectangular, cylindrical, oval, etc. The choice of the design may depend on the volume of the load, the choice of the number of cables (single or double), in case of double cables the desirable distance between the cables, etc.

Figures 6A, 6B, 6C, 6D:
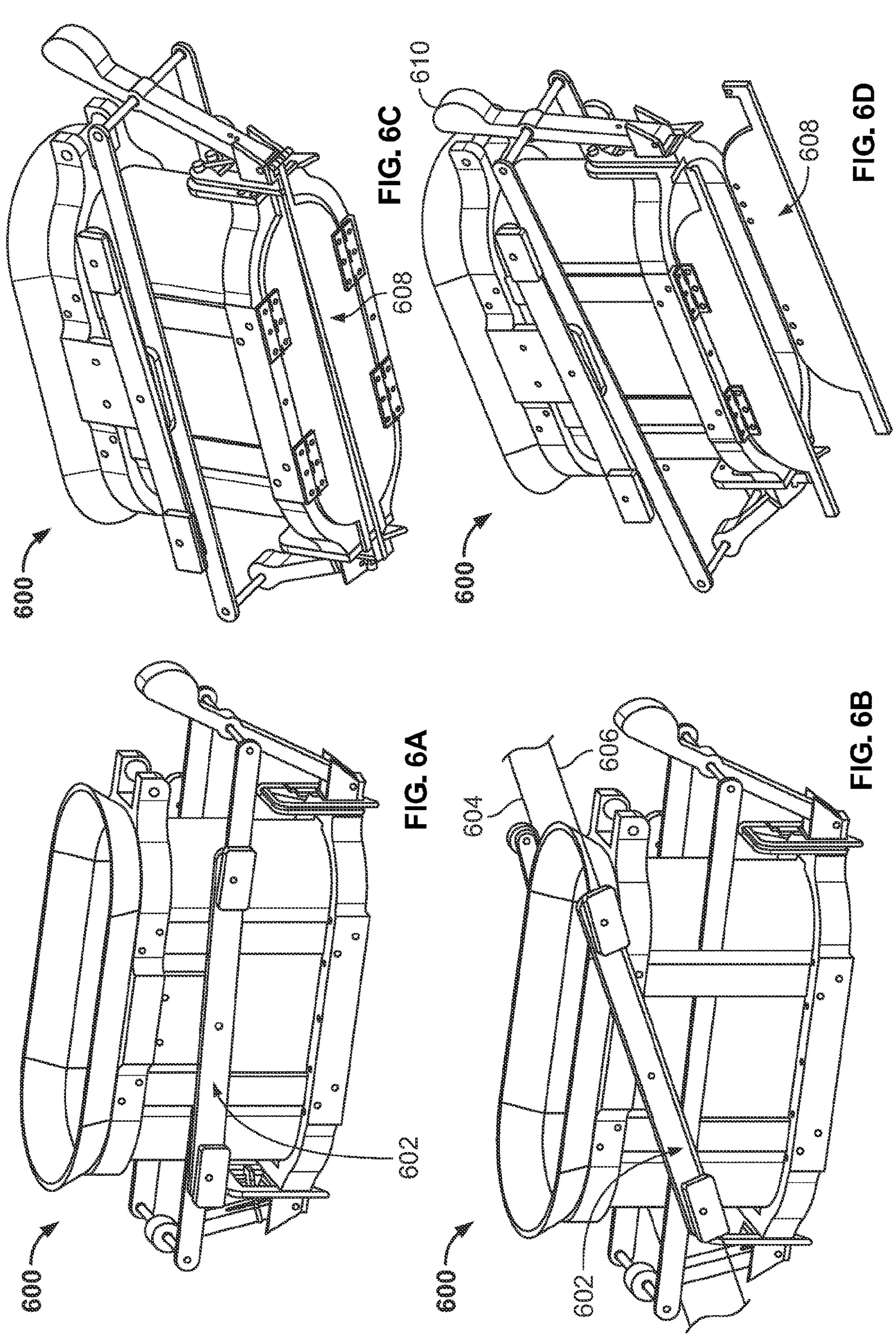
FIGS. 6A-6D show various views and configurations of a semi-oval tram design for a double cable configuration of a gantry delivery component.

FIGS. 6A-6D show a semi-oval tram 600 design for double cable configuration of CrafTram. Referring to FIGS. 6A-6B, a swiveling bracket 602 is attached to the side of the tram, on one of which the cable 606 is attached, and at each end of the other bracket a pulley is installed. These pulleys ride on the other segment of the cable 606. This way the two cables segments, which in motion move in opposite directions, almost equally sustain the weight of the tram.

As shown in FIGS. 6C-6D, the tram doors 608 are at the bottom and are held close by a latch which may be released by a spring-loaded lever 610, which upon return to original position can also pull the doors closed. At the destination point, the doors open when the lever hits an obstacle and gets pushed back by the force of the moving tram before the tram comes to rest at the destination site. FIG. 6D should the lever in the pushed state. Other alternatives besides using the lever approach include the door latches being unlatched by the attraction of magnets installed at the proper position at printhead site, or the latches directly hitting a relatively stationary obstacle as the tram movers close to the dumping site. In the same way, the doors can close by contacting obstacles as the tram begins to return from the unloading site. FIG. 6C shows the doors closed and FIG. 6D shows the doors 608 open.

Figure 7:
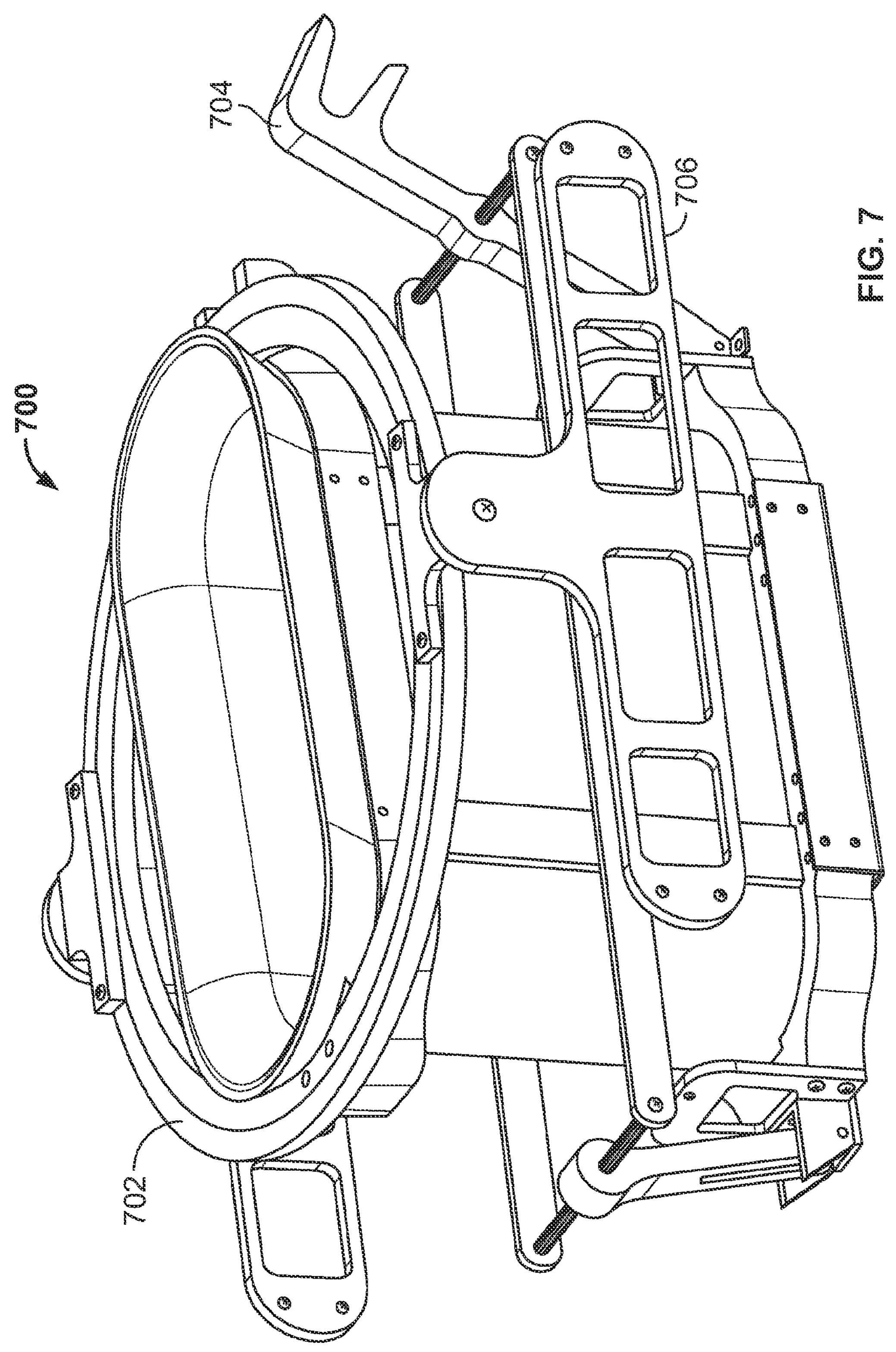
FIG. 7 is a perspective view showing a silo-side tram configured for rotating and aligning itself with a printer-side tram during a material transfer operation.

FIG. 7 shows material source-side tram 700 which is like the material destination tram 600 with the exception of an additional rotation feature 702 for alignment at the material transfer point on tower-top. The rotation feature, which is achieved by mounting the tram container inside a large bearing may be used for the alignment of the upper tram to the random angular orientation of the material destination tram underneath, as explained below. The lever 704 is used to unlatch the tram outlet doors when it reaches the tower-top. The bracket 706 and its counterpart on the other side of the tram would be connected to the cables and are meant to provide swiveling action to keep the tram horizontal as it moves along a sloped trajectory.

Figure 8:
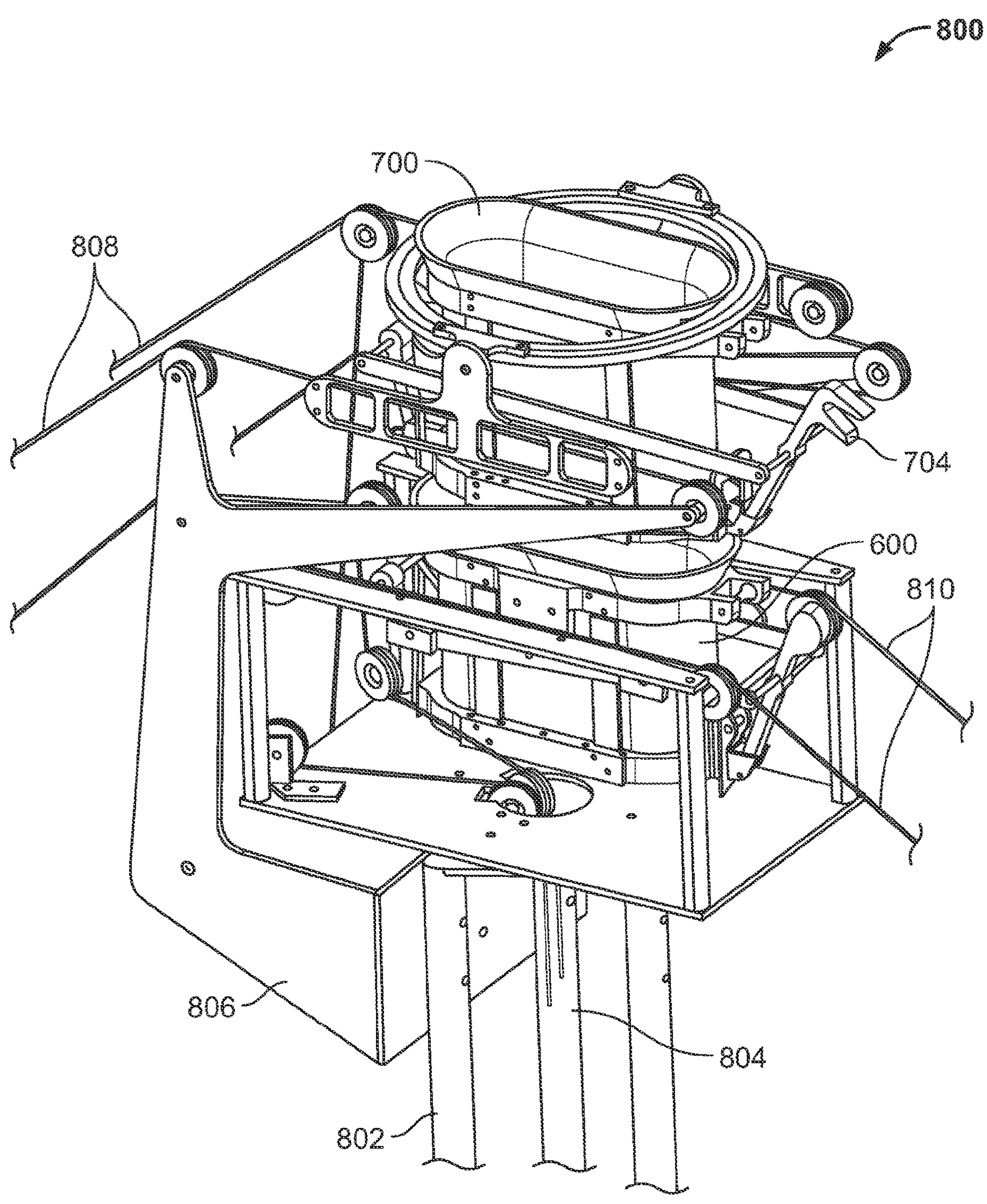
FIG. 8 is a perspective view showing a silo-side tram rotated and aligned with a printer-side tram during a material transfer operation.

Tram Alignment at Material Transfer Point:

FIG. 8 shows the two trams at the transfer point, i.e., the tower-top. The stationary structure 806 is installed on the tower truss and holds the pulleys for cables 808 that move tram 700 between the material source and tower-top. As mentioned above, the platform 812, which receives the material destination tram 600, passively swivels by the pulling force of the cables 810 which are connected to the printhead site, in order to stay aligned with the direction of those cables. The platform 812 also has flexible guide rails (not shown in the figure for simplicity) at the level of the lower section of the upper tram 700 to rather accurately force the container of the above tram to turn and align itself with the orientation of the lower tram. This alignment action can take place either by the rotational force of platform 812 when the tram 700 is already parked on the tower-top, or by the movement of tram 700 as it arrives at the tower-top and pushed into the guide rails when the tram 600 is already parked inside platform 812. The outlet doors of the upper tram open when lever 704 presses against a cross bar (not shown) installed on structure 806. In FIG. 8 cable 804 loops through the cable accumulator, which could be installed on the CrafTram tower 802, and returns through a system of pulleys.

Note that tram-to-tram angular alignment is not needed in case of cylindrical or conical tram containers.

Tram Alignment at Destination Point:

Depending on the position of the printhead, the tram may arrive at the printhead site from various angles. Accordingly, a mechanism is needed for directing the tram such that at the time of unloading its central vertical axis almost coincides with the central axis of the hopper to which the material is supposed to be dumped by the tram. In such arrangement the hopper opening size would be minimal. FIG. 8 shows a source-side tram 700 aligned with a print-side tram 600 that receives material from the upper tram 700 during a material transfer operation at the top of a tower 802. The lower cables 804 run to an accumulator mechanism as described herein above.

Figure 9:
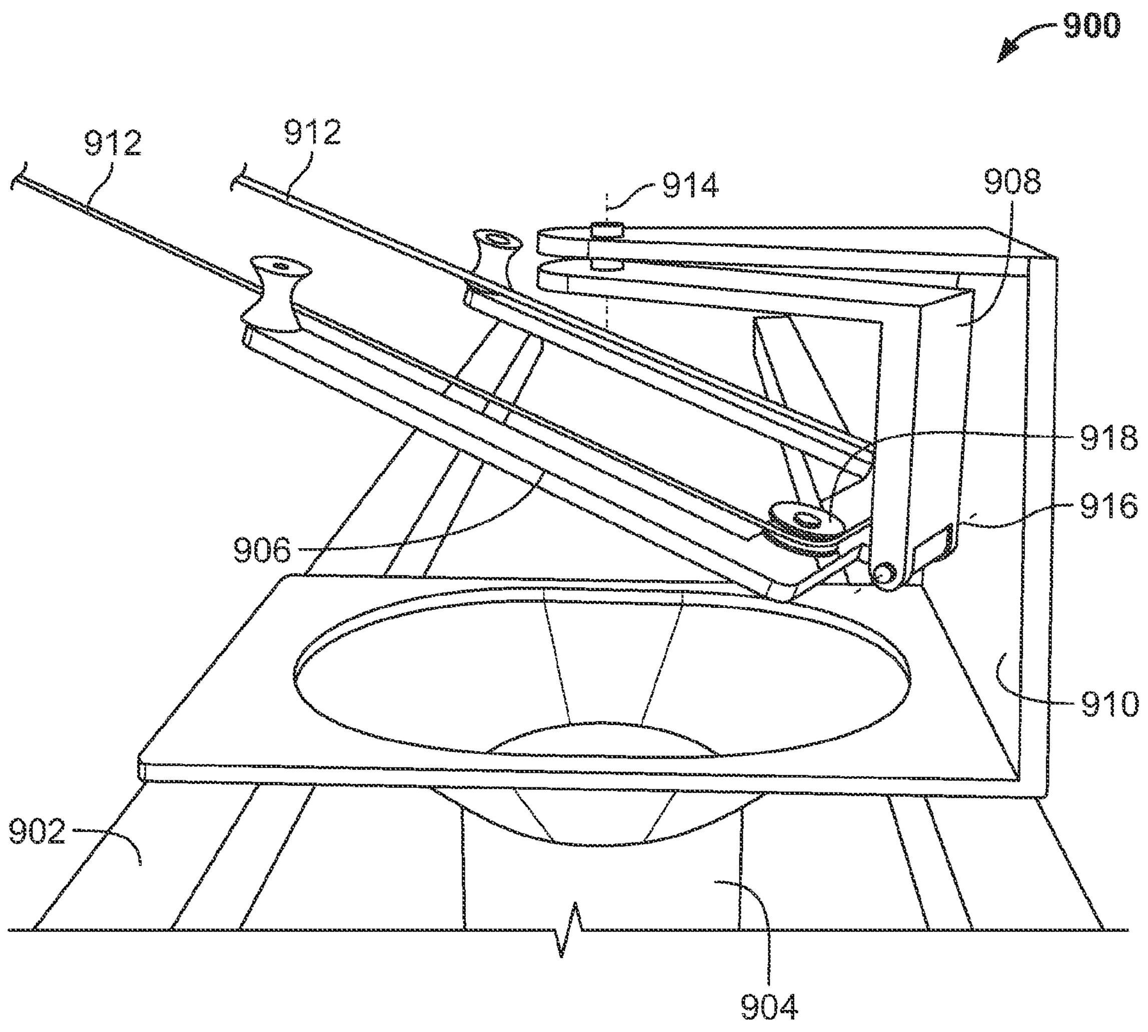
FIG. 9 is a perspective view showing a mechanism for centrally positioning a tram above a hopper at a printhead.
Figures 10A, 10B:
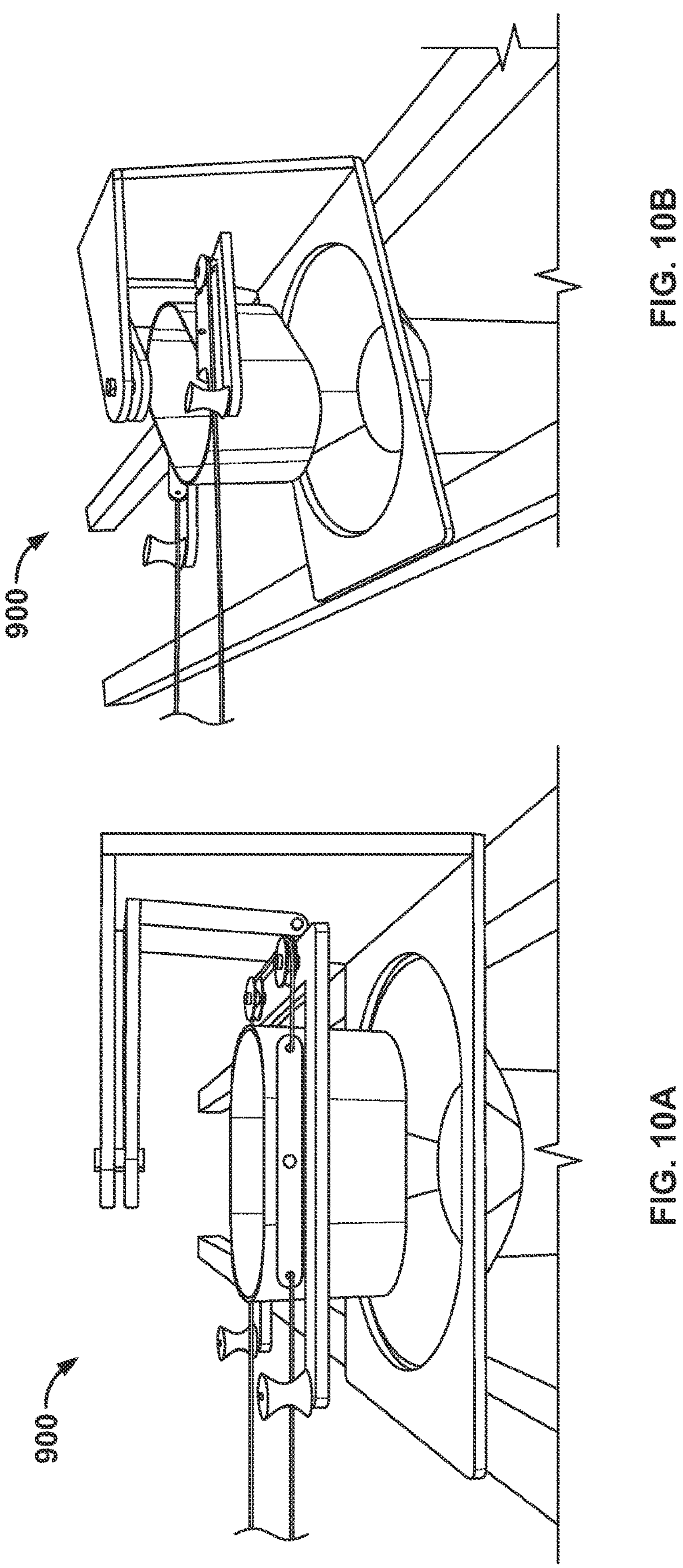
FIGS. 10A-10B are perspective views showing alternative mechanisms for centrally positioning a tram above a hopper at a printhead.

FIGS. 9, 10A and 10B show a positioning mechanism 900 which uses a tram positioning fork 906 which with the force of the cables can passively pivot around a vertical axis 914 and a horizontal axis 916. Referring to FIG. 9, the positioning mechanism 900 is mounted on a backbone structure 910 which is mounted on the printhead platform which is this case reciprocates on the bridge 902 of a gantry robot. The printhead, not shown, is supposed to be positioned under material hopper 904. The main mechanism will be similar for other styles of robots.

Referring to FIG. 9, in this mechanism the tram positioner fork 906 is aligned along both vertical and horizontal axes by the side force of the CrafTram cables 912, which are always in tension. The cables pass between and below two rollers which are installed on the two tips of the fork 906. The alignment fork 906 is free to pivot on a hinge 916 installed on a mounting structure which itself can pivot around the central vertical axis 914 of the printhead assembly relative to the fixed frame 910. Accordingly, the fork and cable return pulleys 918 (one of two shown) passively stay aligned in the direction of the cables. In this arrangement the arriving tram first passes by a sensor which sends a slow-down signal to the motion control unit, and it stops when another sensor which is installed on the fork mechanism sends a stop signal to the control unit to stop the tram rather accurately over the center of the hopper. Slightly before the stop position the unlocking mechanism passively opens the tram outlet doors by being pressed against an obstacle installed on the fork. Other passive or active mechanisms could be used to open and close the tram doors.

FIGS. 10A and 10B show views of the tram positioning system 900 in near horizontal position for when the cables have a near horizontal orientation (FIG. 10A) and when the cables have a declined orientation (FIG. 10B). As shown in either case the tram is centrally positioned above the hopper.

Figure 11:
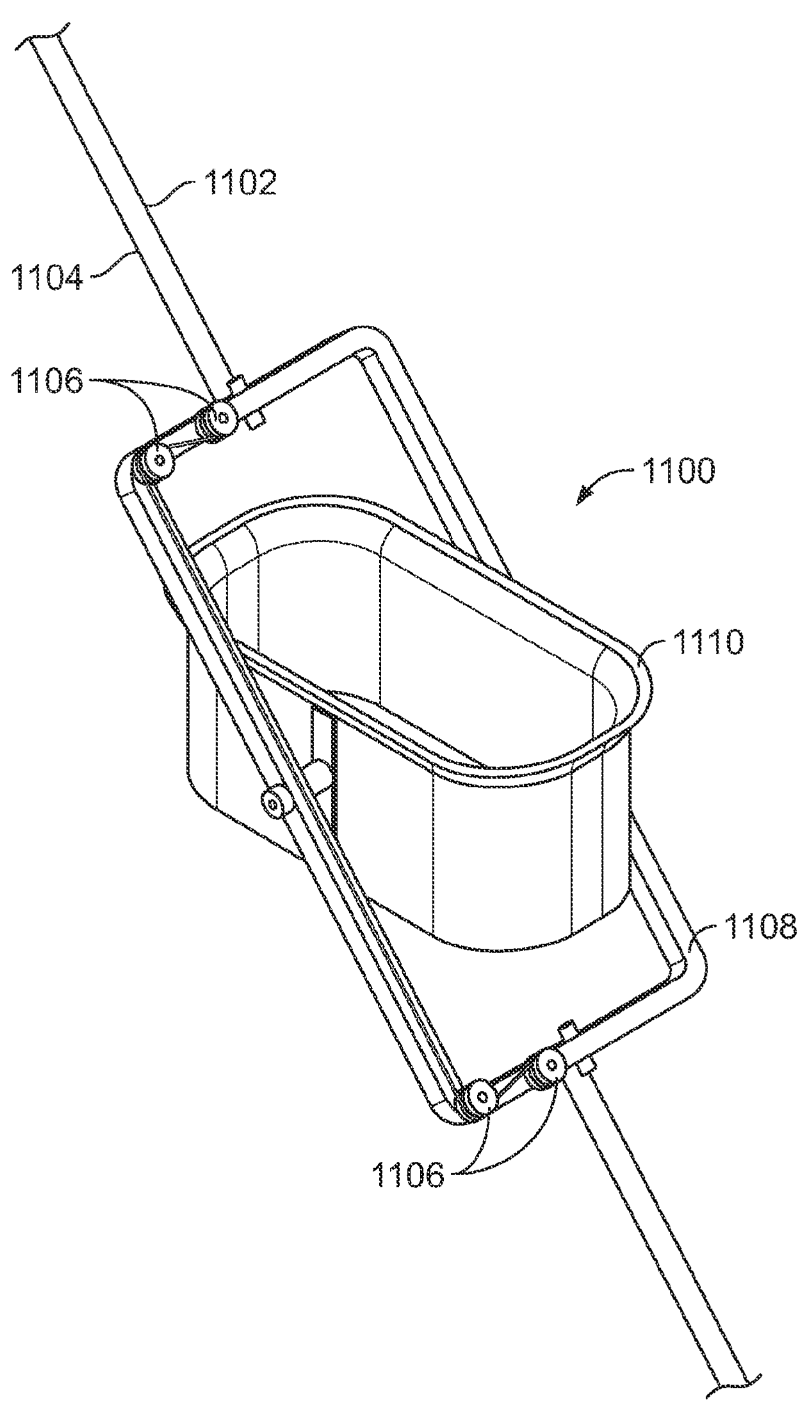
FIG. 11 is a perspective view showing a mechanism for applying motive force to a tram for use in systems having a steep incline.

The Case of Steep Incline/Decline:

In the case of double-cable, the tram is connected to the cable only on one side and on the other side it rides on the return cable by means of pulleys attached to it. The tram can stay rather straight under this lump-sided pulling force as long as the incline/decline angle is not too steep, otherwise, the cable pulling force should be applied near the tram central position. FIG. 11 shows a mechanism 1100 which can accomplish this by connecting the pulling cable 1102 to the edge center of the tram and routing the return cable 1104 around the tram so that it does not stretch over the top opening of the tram, as it would otherwise be on the path of material that is transferred to the tram from above. An arrangement of guide pulleys 1106 on a support frame 1108 may be used to guide the return cable 1104 around the hopper 1110.

Considerations for Dry Material Delivery Using CrafTram:

The main issue concerning dry material delivery in CrafTram is dust mitigation. As long as dry material is in the trams there is no dust problem. Dust becomes a problem whenever the material is transferred to and from the trams. For example, when dumping dry material into the printer hopper to be mixed and extruded at the printer site, there should be an opening preferably with a sliding door on top of the hopper which would be matched with the bottom geometry of the tram. In this case, there should also be a sliding door at the bottom of the tram. Since the tram arrives at variable heights above the hopper, it should gently (e.g., with use of mechanical dampers) descend and accurately land on top of the hopper in such a way that its sliding door sits precisely on top of the sliding door of the hopper. At this point the two doors may be simultaneously slid to the open position by a motorized actuator to transfer the dry material from the tram to the hopper without exposing it to open air.

Figure 12:
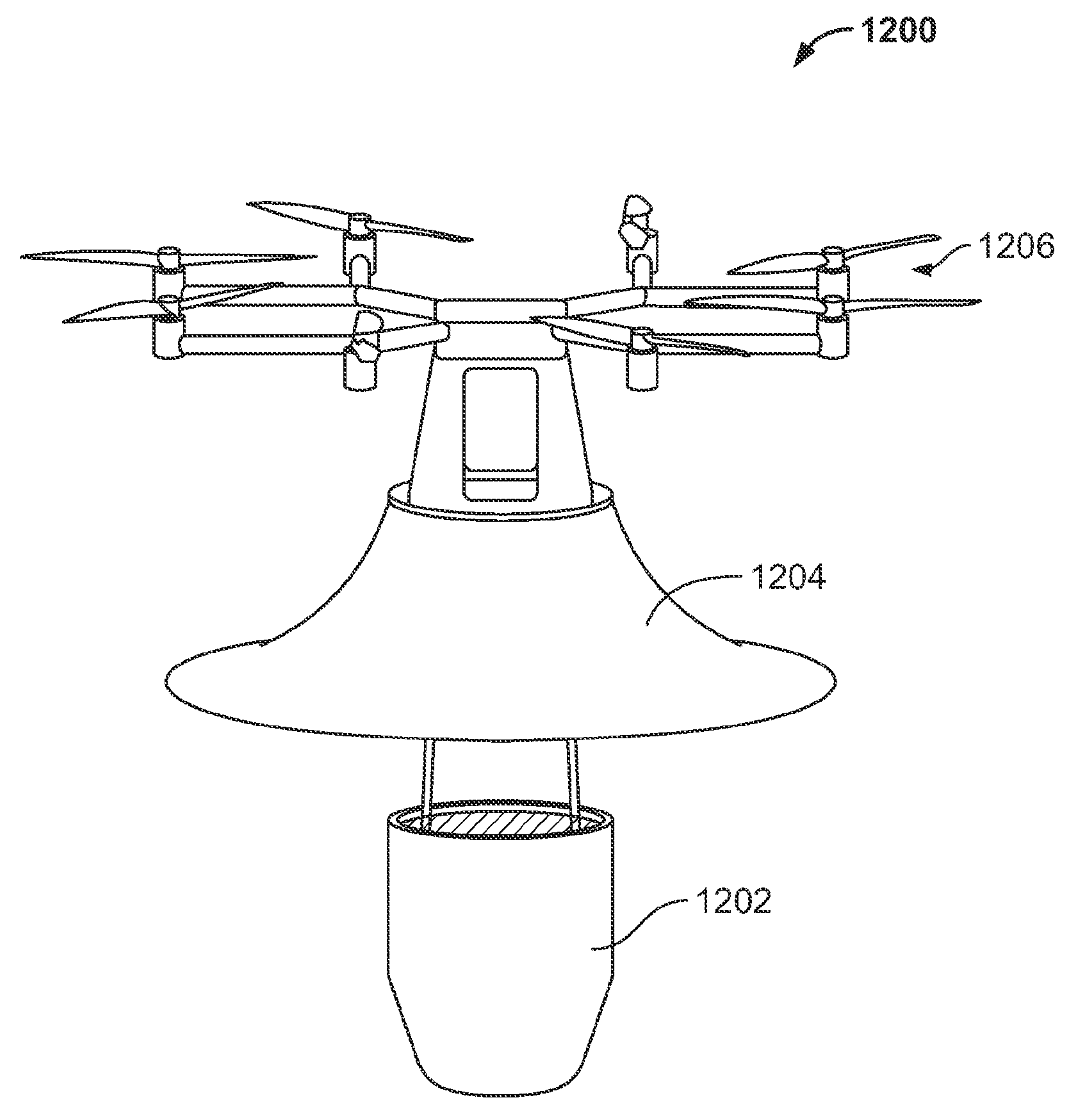
FIG. 12 shows a drone material delivery system with a wind-diverting apron.

Discrete Aerial Material Delivery by Drone:

Another discrete aerial material transfer for construction 3D printing is the direct delivery of material from the source site to the printhead hopper by means of one or more aerial drones. FIG. 12 shows an example of such a drone 1200 including a bucket 1202 for holding material to be transferred, an apron 1204 for diverting rotor downdraft from the bucket, and a rotor assembly 1206. In this case the drone would always go to a fixed position for picking up a bucket filled with material and immediately search for the printhead hopper to which it should unload its bucket. In this case the position of the printhead hopper may be continuously reported to the drone by wireless communication. Alternatively, a GPS device, or a local position locator, may be installed at the printhead site to transmit the position of the printhead in real time. The drone may use the location information to locate the printhead hopper and hover above it. Visual target sign(s) may also be tagged at the hopper site for the drone camera to recognize for precision delivery of the material payload.

A drone 1200 which would be powerful enough to carry a material like concrete would generate a powerful downward draft which could disturb and distort the freshly fabricated wall layers. To mitigate this problem, a light wind diverting apron 1204 as shown in FIG. 12 may be installed under the drone to direct the draft sideways instead of downward. Alternatively, the axes of the propellers can be tilted inward from top to provide a positive dihedral, which also adds to the stability of the drone.

The drone may use rechargeable battery and quickly land to swap its nearly discharged battery with a fully charged one in an automated battery swapping station. In the case where at least two drones are used the drone with low battery charge may quick-charge its battery at a battery charging station while the charged drone(s) perform the material delivery operation. Alternatively, the drone(s) may be tethered to receive uninterrupted power through an electric cable. However, special provisions should be made to prevent the cable from colliding with freshly deposited material on top of the walls of the structure being built. An approach could be placing a constant-force cable retracting spool which would be placed at a high point such as the top of the silo or a dedicated tower next to the construction site. The spool may wind or unwind the electric cable depending on the cable tension. In such a case when the lower layers of the structure are being printed the electric cable may collide with the drone propellers, which would necessitate installing a light-weight shield, which could be made of a circular carbon fiber tube, around the drone propeller set. In any case higher operating voltage, possibly with a transformer on the drone, would be preferable to require thinner and hence lighter and lower-tension electric cable.

One or more drones may be deployed. In case of multiple drone deployment each drone must have sufficient sensory mechanisms (visual, sonar, acoustic, etc.) to avoid collision with other drones. Drone delivery can be very fast, but its main drawback compared with other CrafTram methods is excessive energy consumption.

The terms "a" and "an" are defined as one or more unless this disclosure explicitly requires otherwise. The term "substantially" is defined as largely but not necessarily wholly what is specified (and includes what is specified, e.g., substantially 90 degrees includes 90 degrees and substantially parallel includes parallel), as understood by a person of ordinary skill in the art. In any disclosed embodiment, the terms "substantially," "approximately," and "about" may be substituted with "within a percentage of what is specified, whereon the percentage includes 0.1, 1, 5, or 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements but is not limited to possessing only those elements. Likewise, a method that "comprises," "has," "includes" or "contains" one or more steps possesses those one or more steps but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of or "consisting essentially of" can be substituted for any of the open-ended linking verbs recited above, to change the scope of a given claim from what it would otherwise be using the open-ended linking verb.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A material delivery system for delivering material from a material source to a material destination, wherein the material destination is moveable relative to the material source, the system comprising:

a cable system extending between the material source and the material destination, the cable system comprising:

a cable, a tram coupled to the cable that can be moved between the material source and the material destination by the cable, a drive mechanism configured to control a position of the tram along the cable system, and an accumulator mechanism configured to maintain tension of the cable within an operational range when the material destination moves relative to the material source by accumulating and dispensing lengths of the cable, wherein the tension of the cable is measured by at least one of a standalone cable tension sensor or a sensor that detects power consumption of the drive mechanism, and wherein a computer correlates changes or rates of change of the cable tension or a relative tension with known events, including one of: start of tram return, addition or dropping of payload material, or emergency failure of the material delivery system.

2. The material delivery system of claim 1, wherein the tram is affixed to the cable at a particular position along the cable and the drive mechanism is configured to control the position of the tram by selectively winding in or winding out the cable.

3. The material delivery system of claim 1, wherein the drive mechanism is configured to reduce the speed of the tram when the tram is in proximity of either the material source or the material destination.

4. The material delivery system of claim 1, wherein the cable system comprises multiple trams each having a cable subsystem, the cable subsystems being arranged in series to form a series cable system extending between the material source and the material destination, wherein each pair of consecutive trams are configured to park at a material transfer point common to the tram pair to enable transfer of material from one tram to another.

5. The material delivery system of claim 4, wherein an upper tram of the cable system containing material arrives and parks directly above and in alignment with a parking position of a lower tram of the cable system that is to receive the material and, once the upper and lower trams are parked at the material transfer point, an outlet of the upper tram opens and drops material into the lower tram.

6. The material delivery system of claim 5, wherein the material is a dry powder or a dry mixture, the upper tram securely parks above and in contact with the lower tram at the material transfer point, and the material delivery system uses a secure opening mechanism to transfer the material to minimize dust contamination or loss of material to the environment.

7. The material delivery system of claim 1, wherein either or both of the material source and the material destination are stationary or in motion.

8. The material delivery system of claim 1, wherein the cable system comprises multiple trams each having a cable subsystem, wherein the trams each meet at a single material transfer point, thus enabling material collection at a single location from multiple material sources.

9. The material delivery system of claim 1, wherein the accumulator mechanism comprises two banks to which pulleys are mounted, the two banks being movable relative to each other and wherein the cable is threaded through the pulleys such that relative motion of the banks adds or removes overall cable length available for the material delivery system.

10. The material delivery system of claim 9, wherein the relative motion of the banks is controlled using at least one of a dead weight, a spring, a pneumatic cylinder, or an active linear actuator.

11. The material delivery system of claim 1, wherein one or more of the inner surfaces of the tram are lined with a non-stick coating to prevent the material from sticking to the one or more inner surfaces.

12. The material delivery system of claim 1, wherein the tram is suspended by a double cable arrangement including a first cable line and a second cable line, wherein the first cable line extends from the material source to the material destination and, after circling at least one pulley, forms a second cable line that extends back to the material source, and wherein a first side of the tram is fixed to one of the cable lines and the tram can glide over the other cable line using pulleys mounted on an opposite second side of the tram.

13. The material delivery system of claim 12, wherein the cable system further comprises a frame that couples the tram to the cable, the frame including a pivot mechanism that enables the tram to pivot relative to the frame such that the tram will remain substantially horizontal if the frame pivots away from a horizontal orientation, wherein opposing sides of the frame are connected to ends of the cable.

14. The material delivery system of claim 12, wherein the cable forms a complete loop using at least one pulley located at the material source and at least one pulley located at the material destination.

15. The material delivery system of claim 13, wherein a pulley located at the material source or at the material destination forms part of the drive mechanism.

16. The material delivery system of claim 1, wherein the tram is configured to deliver construction material as well as components including one or more of reinforcement, plumbing, electrical, tiling, or other construction related paraphernalia.

17. The material delivery system of claim 1, wherein the material destination comprises a printhead of a construction-scale 3D printer.

18. A material delivery system for delivering material from a material source to a material destination, wherein the material destination is moveable relative to the material source, the system comprising:

- a cable system extending between the material source and the material destination, the cable system comprising:
  - a cable,
  - a tram coupled to the cable that can be moved between the material source and the material destination by the cable,
  - a drive mechanism configured to control a position of the tram along the cable system, and
  - an accumulator mechanism configured to maintain tension of the cable within an operational range when the material destination moves relative to the material source;
- a tower located between the material source and the material destination, the tower including a top that the tram is configured to traverse, the top of the tower being located at a height that ensures the tram will not encounter interference from any obstacles located along the path between the material source and the material destination; and
- a swivel mechanism provided at the top of the tower that is configured to account for movement of the material destination and enable the tram to reach the material destination.

19. The material delivery system of claim 18, wherein the height of the tower is adjustable to ensure the tram will avoid any obstacles located along the path between the material source and the material destination while also minimizing the total distance traversed by the tram.

20. The material delivery system of claim 18, wherein the tram is affixed to the cable at a particular position along the cable and the drive mechanism is configured to control the position of the tram by selectively winding in or winding out the cable.

21. The material delivery system of claim 20, wherein the material is a dry powder or a dry mixture, the tram securely parks above and in contact with a receiving hopper located at the material destination, and the system uses a secure opening mechanism to transfer the material to minimize dust contamination or loss of material to the environment.

22. The material delivery system of claim 18, wherein the drive mechanism is configured to reduce the speed of the tram when the tram is in proximity of either the material source or the material destination.

23. The material delivery system of claim 18, wherein the cable system comprises multiple trams each having a cable subsystem, the cable subsystems being arranged in series to form a series cable system extending between the material source and the material destination, wherein each pair of consecutive trams are configured to park at a material transfer point common to the tram pair to enable transfer of material from one tram to another.

24. The material delivery system of claim 18, wherein the cable system comprises multiple trams each having a cable subsystem, wherein the trams each meet at a single material transfer point, thus enabling material collection at a single location from multiple material sources.

25. A material delivery system for delivering material from a material source to a material destination, wherein the material destination is moveable relative to the material source, the system comprising:

- a cable system extending between the material source and the material destination, the cable system comprising:
  - a cable,
  - a tram coupled to the cable that can be moved between the material source and the material destination by the cable, the tram including an outlet through which material carried by the tram can be delivered to the material destination,
  - a drive mechanism configured to control a position of the tram along the cable system, and
  - an accumulator mechanism configured to maintain tension of the cable within an operational range when the material destination moves relative to the material source;
- a pivot mechanism associated with the material destination configured to receive and align the tram with the material destination to enable the tram to park at the material destination; and
- an opening mechanism associated with the material destination configured to open the tram outlet when the tram parks at the material destination to deliver the material carried by the tram to the material destination.

26. The material delivery system of claim 25, wherein the tram is affixed to the cable at a particular position along the cable and the drive mechanism is configured to control the position of the tram by selectively winding in or winding out the cable.

27. The material delivery system of claim 25, wherein the drive mechanism is configured to reduce the speed of the tram when the tram is in proximity of either the material source or the material destination.

28. The material delivery system of claim 25, wherein the cable system comprises multiple trams each having a cable subsystem, the cable subsystems being arranged in series to form a series cable system extending between the material source and the material destination, wherein each pair of consecutive trams are configured to park at a material transfer point common to the tram pair to enable transfer of material from one tram to another.

29. The material delivery system of claim 25, wherein the cable system comprises multiple trams each having a cable subsystem, wherein the trams each meet at a single material transfer point, thus enabling material collection at a single location from multiple material sources.

* * * * *